June 4, 1968   R. H. CAMPBELL, JR., ET AL   3,386,326
MECHANICAL CAPTURE SYSTEM Filed June 25, 1965                              7 Sheets-Sheet 1

INVENTORS.
RICHARD H. CAMPBELL, JR.
VERNON F. BRAUN
BY
Ronald Hengel
ATTY.

June 4, 1968 R. H. CAMPBELL, JR., ET AL 3,386,326
MECHANICAL CAPTURE SYSTEM
Filed June 25, 1965 7 Sheets-Sheet 4

INVENTORS.
RICHARD H. CAMPBELL, JR.
VERNON F. BRAUN
BY

June 4, 1968 R. H. CAMPBELL, JR., ET AL 3,386,326
MECHANICAL CAPTURE SYSTEM
Filed June 25, 1965 7 Sheets-Sheet 7

INVENTORS.
RICHARD H. CAMPBELL, JR.
VERNON F. BRAUN

United States Patent Office 3,386,326
Patented June 4, 1968

3,386,326
MECHANICAL CAPTURE SYSTEM
Richard H. Campbell, Jr., Gilford, N.H., and Vernon F. Braun, St. Louis, Mo., assignors, by mesne assignments, to Vernon F. Braun, St. Louis, Mo.
Filed June 25, 1965, Ser. No. 466,967
11 Claims. (Cl. 84—345)

ABSTRACT OF THE DISCLOSURE

A mechanical capture system for automatically reproducing desired voicing patterns of a musical instrument is illustrated. Conventional voice tabs are interrelated with a series of capture tabs to form a matrix. Actuation of a selected capture tab will produce the desired positioning of each of the voice tabs, thus creating a number of automatically reproduceable voicing arrangements equal to the number of capture tabs utilized.

---

This invention relates generally to a mechanical capture system for controlling the position of the voice tabs of a musical instrument and more specifically to a mechanical capture system having a memory device to insure the accurate reproduction of a desired combination of voice tab positions upon subsequent energization of the system.

In a musical instrument, particularly an electrical musical instrument that has a fundamental frequency produced by a tone generator, it is desirable to provide a harmonic content for the produced signal. This harmonic content, which provides many of the pleasing aspects of music and is usually known as "voice," can be provided by utilizing other frequencies to modify the produced tone. These additional frequency signals are usually controlled by manipulating voice tabs which often have to be depressed in combinations. Thus, it is desirable to have some arrangement for obtaining the desired combinations by a single operation. The present invention is directed toward an improved system for procuring desired voice tab combinations by the actuation of a single control.

Prior art devices that have attempted to solve the problems inherent in such a system have generally involved rather complicated and bulky arrangements. These prior art devices, due to their complexity, have generally included more parts than would be actually necessary in a simplified arrangement. This is especially true with respect to the moving parts of the systems. In these prior art devices, a further disadvantage inheres in the fact that the memory elements utilized have a single type of motion available, so that at least two energizing means for the memory element are necessary if a two position memory is used.

Briefly, in a preferred form thereof, this invention utilizes a memory tab arranged to have both longitudinal and rotary motion. A shaft connected to a voice tab is arranged to be contacted by at least one memory tab upon either rotary or longitudinal motion of the memory tab. One type of motion is given to the memory tab by an actuating capture means connected to the memory tab. Actuation of the capture means produces this one type of motion of the memory tab and places the memory tab in a "set" condition. While the memory tab is in the "set" position, movement of the voice tab will place the memory tab in a given memory condition depending upon which of the two positions of the voice tab is chosen. This setting motion of the memory tab is provided by the shaft connected to the voice tab. The memory tab is maintained in the desired memory condition by a retaining means which consists of a U-shaped slot formed in the memory tab and a fixed shaft located in the slot.

As the memory tab is placed in one memory condition, the fixed shaft is located in one or the other of the parallel paths of the U-shaped slot. The movement of the memory tab is restricted so that the fixed shaft will stay in the path of the U-shaped slot in which it is placed until the capture means is actuated and the voice tab is moved to place the fixed shaft in the other path of the U-shaped slot. Thus, actuation of the capture means will always reproduce the same setting of the voice tab until the fixed shaft in the U-shaped slot is deliberately moved to the other path of the U-shaped slot. By utilizing the principles described above and having a group of memory tabs associated with each voice tab and a set of memory tabs consisting of one memory tab from each of the groups of memory tabs connected to a capture means, a memory matrix may be formed, and a plurality of voice tab combinations may be achieved by successive actuation of individual capture means.

Accordingly, it is a primary object of this invention to provide a simplified mechanical capture system that accurately retains and reproduces a desired voice tab combination setting upon proper actuation.

A further object of this invention is to provide a mechanical capture system having fewer moving parts and a corresponding decrease in cost.

Yet another object of this invention is to provide a mechanical capture system having a dual-motion memory element to eliminate the plurality of memory energizing means previously required.

These and other objects, advantages, and features of the subject invention will hereinafter appear, and, for purposes of illustration, but not of limitation, exemplary embodiments of the subject invention will be hereinafter described, with reference to the accompanying drawings in which:

Figure 1:
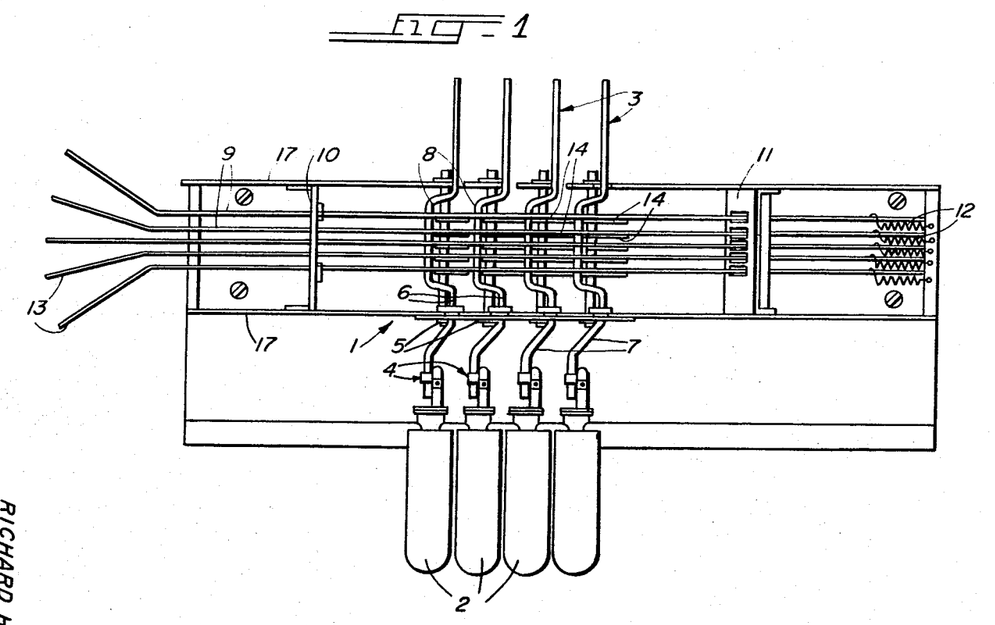
FIGURE 1 is a top plan view of a preferred embodiment of a mechanical capture system produced in accordance with the subject invention.
Figure 2:
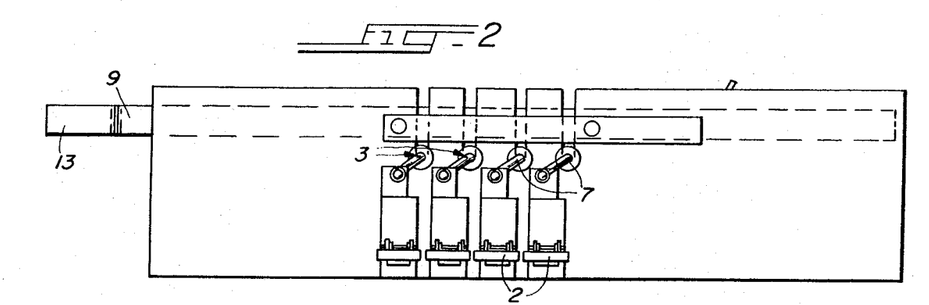
FIGURE 2 is a side view of the embodiment shown in FIGURE 1.

With reference to the drawings, a mechanical capture system is indicated generally as 1 in FIGURE 1. Mechanical capture system 1 may be utilized in different environments, but the preferred environment is in a musical instrument known as an electronic organ. In reproducing music with an electronic organ, it is generally necessary to provide some harmonic content ("voice") or wave shaping of the basic generated tone. Control of the harmonic content is achieved by the use of voice tabs (frequently referred to as stops or stop keys in an organ) such as those indicated by 2 in FIGURE 1. Voice tabs 2 are connected to electrical circuits to provide the desired harmonic content. However, the present invention is concerned with the mechanical control of voice tabs 2, and accordingly the electrical circuits are not shown but should be understood to comprise conventional arrangements.

As shown in FIGURE 1, voice tabs 2 are connected to positioning shafts 3 by linkage arrangements indicated generally as 4 and hereinafter described in detail. Shafts 3 extended into the mechanical capture system 1 through journal bearings 5. Portions 6 of shafts 3 extend inside mechanical capture system 1, while portions 7 of shafts 3 extend from capture system 1 to linkages 4. Portions 6 of shafts 3 are shown as having raised crank portions 8 and portions 7 of shafts 3 are preferably flexible in nature, for a purpose hereinafter described.

In operation a force is applied to the raised crank portions 8 so that a rotary motion is imparted to shafts 3. Thus, the portions 6 of shafts 3 act as crank shafts and impart a rotary motion to the shafts. This rotary motion permits the use of flexible shaft portions 7 so that a curved keyboard (or voice tab board) may be readily serviced by a compact system produced in accordance with the subject invention.

A plurality of capture tabs 9 are arranged perpendicularly to the longitudinal axes of shafts 3. Capture tabs 9 are slidably supported in frame sections 10 and 11. Capture tabs 9 are also biased by springs 12 in a direction away from operating handles 13 provided on each capture tab 9 (i.e., to the right in FIGURE 1). Springs 12 insure that the capture tabs 9 will be returned to a normal rest position after actuation, without requiring a separate reset arrangement.

Vertically extending memory tabs 14 are connected at various points along capture tabs 9. Memory tabs 14 are also in position to contact an associated shaft 3 upon actuation of capture tabs 9. Of the group of memory tabs 14 associated with each voice tab shaft 3, one tab 14 of each group is connected along the length of a particular capture tab 9 to form a set of tabs 14. Similarly, each group of memory tabs 14 associated with a particular voice tab shaft 3 includes one memory tab 14 from each set connected to individual capture tabs 9. Thus, if a particular voice tab and a particular capture tab are chosen, an individual memory tab is defined, that is, each memory tab 14 may be individually defined by selecting a particular capture tab and a particular voice tab.

Figure 3:
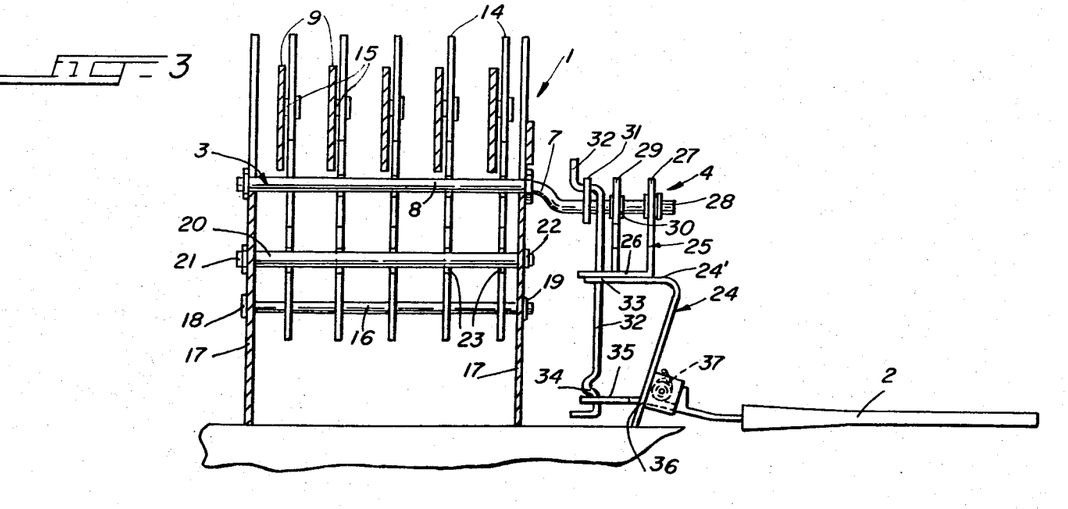
FIGURE 3 is an end view of the embodiment shown in FIGURE 1.
Figure 4:
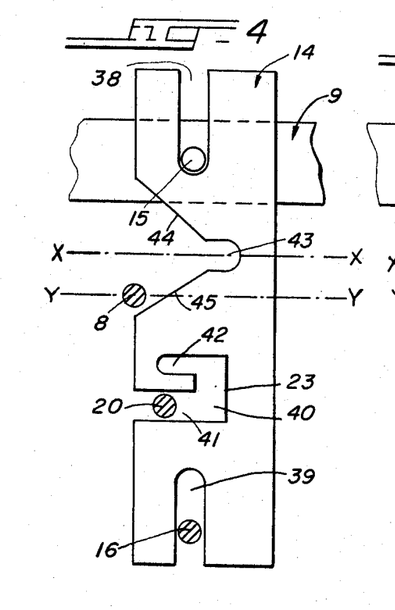
FIGURE 4 is a schematic view of the capture means and memory tab of the embodiment shown in FIGURE 1, with the voice tab shaft located in one position.
Figure 5:
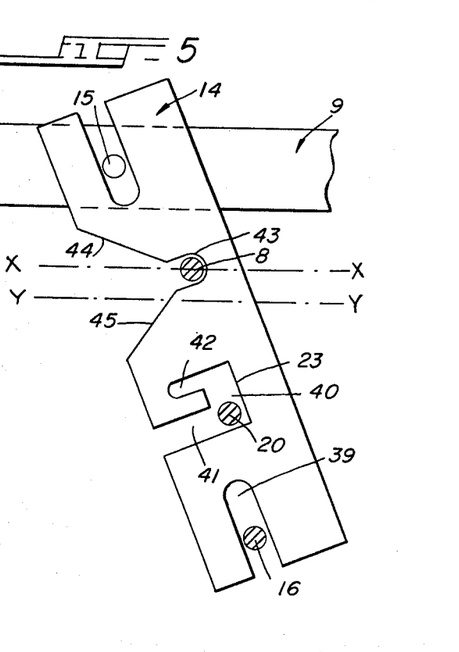
FIGURE 5 is a schematic view corresponding to FIGURE 4 after actuation of the capture means.
Figure 6:
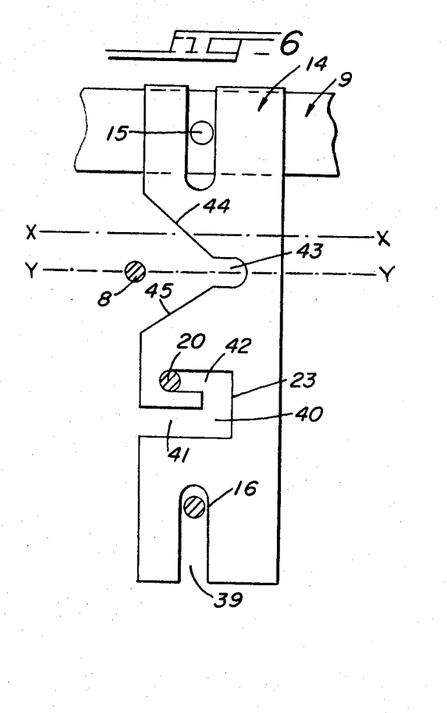
FIGURE 6 is a schematic view corresponding to FIGURE 4 after de-activation of the capture means and movement of the voice tab shaft to another position.

As shown in FIGURE 3, memory tabs 14 are connected to capture tabs 9 by means of connecting shafts 15. The bottom ends of memory tabs 14 are connected to a fixed shaft 16 which is supported in a frame 17 of mechanical capture system 1 at points 18 and 19. Frame 17 thus serves as a casing surrounding mechanical capture system 1. Another fixed shaft 20 is supported in frame 17 at points 21 and 22. As shown in FIGURES 4–6, memory tabs 14 have U-shaped slots 23 which cooperate with an associated shaft 20. The position of shaft 20 in U-shaped slots 23 determines the memory characteristic of the system. It should be realized that a shaft 16 and a shaft 20 are supplied for each group of memory tabs associated with a particular voice tab.

The particular structure of memory tabs 14 may be more clearly understood by reference to FIGURES 4–6. Shaft 15 (which connects capture tab 9 to memory tab 14) is located in a vertical slot 38 of memory tab 14. Similarly, supporting shaft 16 is located in a slot 39. Placing fixed supporting shaft 16 in slot 39 and shaft 15 in slot 38 permits memory tab 14 to exhibit both rotary motion about shaft 16 as a pivot point as well as vertical motion as shafts 15, 16 ride up and down in slots 38, 39 respectively as a result of vertical movement of memory tab 14. U-shaped slot 23 has a vertical path 40 and parallelly aligned horizontal paths 41 and 42 that extend perpendicularly from path 40. The position of fixed shaft 20 in either path 41 or path 42 determines the memory condition of memory tab 14. Crank portion 8 of positioning shaft 3 is located adjacent to memory tab 14 near a groove 43 provided therein. Cam surfaces 44 and 45 are located on either side of groove 43 so that rotary motion of memory tab 14 will force crank portion 8 of shaft 3 into groove 43 along either cam surface 44 or cam surface 45.

FIGURE 3 also serves to illustrate the operation of voice tab 2 and its associated structure. An angular section 24 is securely fastened in a stable position. An L-shaped section 25 is provided with a horizontal portion 26 and a vertical portion 27. Portion 26 abuts a horizontal portion 24' of angular section 24, and portion 27 has a journal bearing 28 to support portion 7 of shaft 3. Another vertical member 29 contains a journal bearing 30 to additionally support portion 7 of shaft 3. A small link 31 is connected to shaft portion 7 and to a vertical shaft 32. Vertical shaft 32 extends through horizontal portion 24' of angular section 24 and through horizontal portion 26 of L-shaped section 25 at point 33. A hook-shaped portion 34 at the lower end of vertical shaft 32 is connected to a rearwardly extending portion 35 of voice tab 2. Voice tab 2 is pivotally supported in angular section 24 at point 36. A spring 37 biases voice tab 2 toward a normal "down" position. When a rotary motion is imparted to shaft portion 7, the motion is transmitted to the link 31 which converts the motion to a downwardly extending force on vertical shaft 32. As vertical shaft 32 is driven downward, voice tab 2 is caused to pivot about point 36 against the force of spring 37 to reach an opposite or "up" position for voice tab 2. Similarly, if voice tab 2 were manually or mechanically raised, the motion would be transmitted through vertical shaft 32 and link 31 to cause a rotary motion of shaft portion 7 and hence to impart a rotary motion to shaft 3.

The operation of the mechanical capture system will now be described. First, the operation will be described with respect to a single voice tab, a single capture tab, and a single memory tab with the aid of FIGURES 4–6, after which the operation of this system as a whole can be best described. Capture tab 9 is shown in its de-activated position in FIGURE 4, with shaft 20 in path 41 of U-shaped slot 23 and raised crank portion 8 of shaft 3 in its lowermost position adjacent cam surface 45. This lowermost portion corresponds to a positioning of the associated voice tab 2 in its "up" position and is represented in FIGURES 4–6 by an imaginary line Y—Y. The first step in setting the memory condition of memory tab 14 is to actuate and move capture tab 9 to its actuating position (as shown in FIGURE 5). During the motion of tab 9 to this position, crank portion 8 of shaft 3 is contacted by cam surface 45 which forces crank portion 8 into slot 43. Since shaft 20 is positioned in path 41 of U-shaped slot 23 (which means that groove 43 is at its highest point along an imaginary line X—X), the actuation of capture tab 9 drives crank portion 8 into its uppermost position along said imaginary line X—X, as shown in FIGURE 5. The positioning of crank portion 8 of shaft 3 corresponds to a positioning of the associated voice tab 2 in its "down" position, as represented in FIGURES 4–6 by imaginary line X—X. Thus, the position of shaft 20 in path 41 acts as a memory condition to insure that upon every actuation of capture tab 9 crank portion 8 of shaft 3 will be either retained in or moved to its uppermost line X—X position, corresponding to a "down" positioning of the associated voice tab 2.

The position shown in FIGURE 5 is also the "set" condition since shaft 20, while still remaining at the level of path 41, is now also in the cross-path 40 of U-shaped slot 43. While this position of memory tab 14 is referred to as a single "set" condition, it should be realized that there are actually two "set" conditions—one at either end of cross-path 40. Thus, if voice tab 2 were now to be raised to its "up" position from its "down" position as represented in FIGURE 5, crank portion 8 of shaft 3 would be driven down (beneath imaginary line X—X to imaginary line Y—Y), and memory tab 14 would correspondingly be driven down so that shaft 20 would be placed at the path 42 end of cross-path 40. De-actuation of capture tab 9 at this juncture would then return memory tab 14 to its vertical position and place shaft 20 in the closed end of path 42, as shown in FIGURE 6.

With shaft 20 in path 42 of U-shaped slot 43, any future actuation of capture tab 9 would retain or position crank portion 8 of shaft 3 in its lowermost position (along imaginary line Y—Y) and would thus retain or position the associated voice tab 2 in its corresponding "up" position. Therefore, any subsequent actuation of capture tab 9 from its FIGURE 6 disposition would cause cam surface 44 to contact crank portion 8 of shaft 3 (if crank portion 8 had been moved to its X—X position by a corresponding positioning of the associated voice tab 2 in its "down" position) and would thus force crank portion 8 into groove 43 to return crank portion 8 to its lowermost Y—Y position. This operation would continue until the memory condition was deliberately changed by moving shaft 20 to path 41 by lowering voice tab 2 during the time that capture tab 9 was actuated.

Thus, actuation of capture tab 9 will place memory tab 14 in its "set" position. The memory condition of memory tab 14 may be maintained or changed at this time by retaining or setting voice tab 2 in the desired position (i.e., either "up" or "down"). This action will locate shaft 20 in the proper path of U-shaped slot 23 to insure that the desired position of voice tab 2 will be realized upon every actuation of capture tab 9 until shaft 20 is deliberately moved to the other path of U-shaped slot 23 during a "set" position such as shown in FIGURE 5.

Since each of the memory tabs, when a plurality of memory tabs is involved, operates in the manner as that described for a single memory tab, the operation for a plurality of memory units is just an extension of the operation of a single unit. The main point in connection with a plurality of memory units is the matrix formation achieved by having a group of memory tabs associated with each voice tab and a set of memory tabs associated with each capture tab and consisting of one memory tab from each group of memory tabs. By choosing a particular voice tab and a particular capture tab, coordinates for an individual memory tab are defined, and such defined individual memory tab exhibits the operation described above.

In actual practice, of course, a plurality of voice tabs would be utilized to provide for as many fine variations of voice as would be practicably possible. Similarly, a plurality of capture tabs would be realized in order to obtain as many different combinations as possible. A desirable feature of the described embodiment of the invention is that as a result of the fact that the capture tabs are stacked along the longitudinal axis of shafts 3, provision may be as made for as many capture tabs as is desired. Another advantage of this particular embodiment is that the rotary motion given to shaft 3 permits the use of flexible shaft portions 7 in order to service a curved keyboard (such as the type typically found in theater organs).

Figure 7:
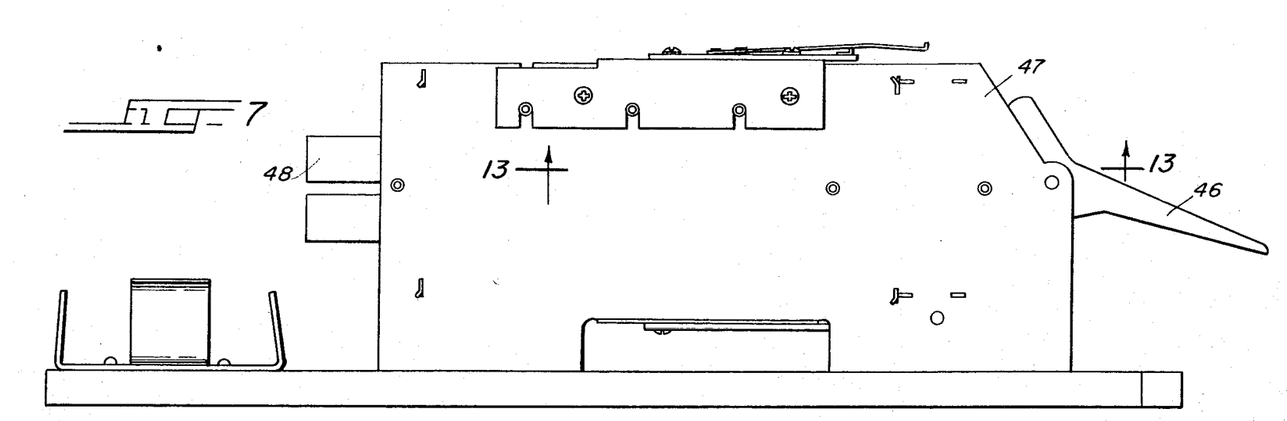
FIGURE 7 is a side view of a second embodiment of a mechanical capture system incorporating the features of the subject invention.

In FIGURE 7, another embodiment of the subject invention is illustrated. Voice tab 46 used in this embodiment is shown as being a conventional type of tab or stop positioned in a mechanical capture system frame 47. The ends of a memory tab 48 are visible also in this figure, but the structure of memory tab 48 is more clearly illustrated in FIGURE 8, which also shows the relationship of memory tabs 48 to capture tabs 49. Memory tabs 48 are mounted on a fixed shaft 50 which is located in a longitudinal slot 51 formed at one end of memory tabs 48. The placing of fixed shaft 50 in the longitudinal slot 51 provides a pivot point for rotary motion of memory tabs 48 and yet does not prevent a horizontal motion of memory tabs 48. Capture tabs 49 are connected to memory tabs 48 by shafts 52 which are located in vertical slots 53, to permit both horizontal and rotary motion. Capture tabs 49 are rigidly fastened to rotatable rods 54, which serve to actuate capture tabs 49. A U-shaped slot having a cross-path 56 and parallel paths 57 and 58 is formed in each of the memory tabs 48. The end of memory tabs 48 away from the mounting shaft 50 contains a groove 60 having cam surfaces 61 and 62 on either side thereof. Cam surfaces 61 and 62 are located adjacent a shaft 63 connected to voice tab 46. Cam surfaces 61 and 62 are arranged to contact shaft 63 upon actuation of the capture tabs in order to force shaft 63 into groove 60.

Figure 9:
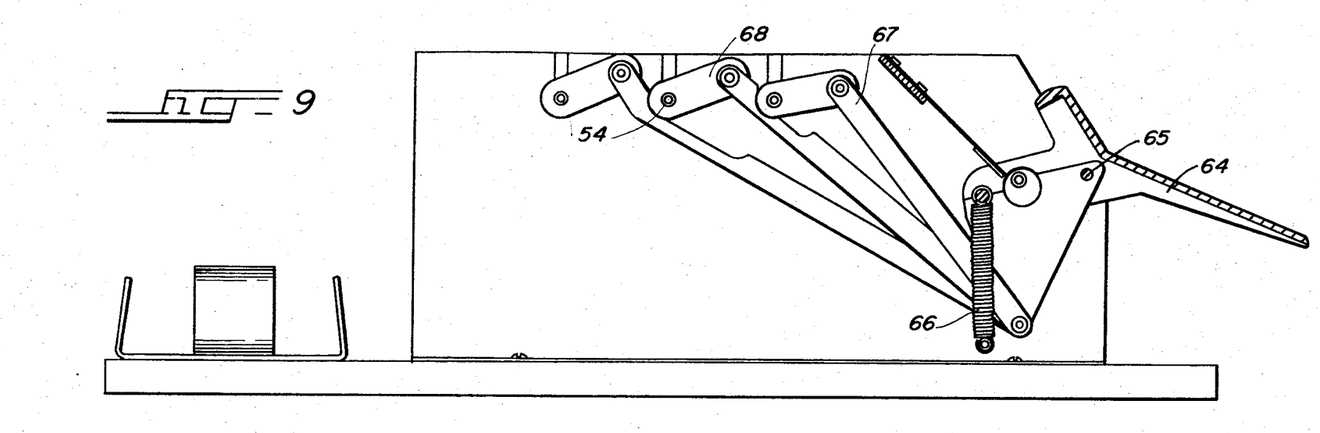
FIGURE 9 is a sectional side view taken along the line 9—9 of FIGURE 11 illustrating the actuation arrangement of the capture means of the embodiment shown in FIGURE 7.
Figure 10:
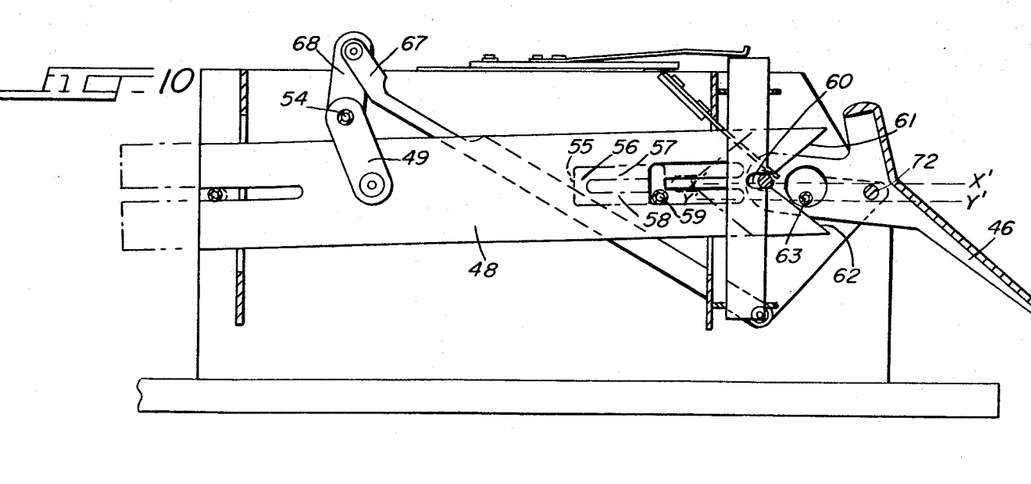
FIGURE 10 is a sectional side view taken along the line 10—10 of FIGURE 11 illustrating a single memory tab and a single capture means after actuation of the capture means of the embodiment shown in FIGURE 7.

An actuation means for capture tabs 49 is shown as a manually or mechanically energizable actuation tab 64 in FIGURE 9. Actuation tab 64 is pivoted about point 65 and biased to its normally up position as shown in FIGURE 9 by spring 66. As actuation tab 64 is depressed, links 67 and 68 are forced to the position shown in FIGURE 10. This action of links 67 and 68 causes shaft 54 to be rotated and thereby produce a horizontal motion of memory tab 48. FIGURE 10 also illustrates how the horizontal motion of memory tab 48, promoted by actuation of capture tab 49, causes cam surfaces 61 and 62 to contact shaft 63 of voice tab 46 in order to drive shaft 63 into groove 60.

Figure 11:
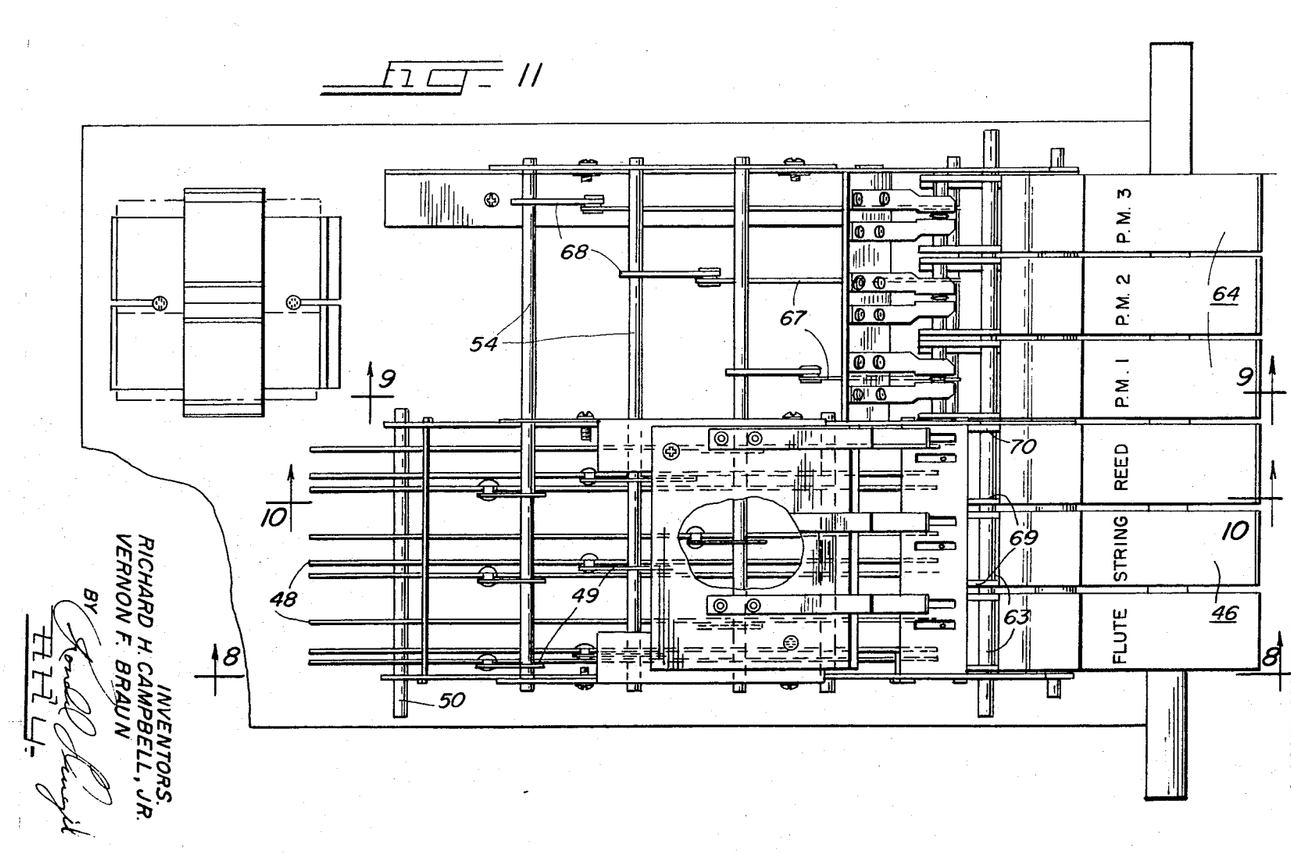
FIGURE 11 is a top plan view of the embodiment shown in FIGURE 7.

In FIGURE 11 the arrangement of the mechanical capture system having a plurality of the units discussed in FIGURES 7–10 is shown. Actuation tabs 64 are each shown to be connected to a single shaft 54. Voice tabs 46 each have a shaft 63 connected between projections 69 and 70 at the back of the tabs. Each of the shafts 63 has a group of memory tabs associated with it. The number of memory tabs in the group is limited by the length of shafts 63, but sufficient memory tabs may be utilized to provide a practical system. In this embodiment each shaft is illustrated as having three memory tabs associated with it. Each memory tab 48 has a capture tab 49 connected to it. Each of the capture tabs 49 is rigidly connected to a rotatable shaft 54, with each shaft 54 having a set of capture tabs 49 connected to it. The set of capture tabs 49 associated with a single rod 54 has an equivalent set of memory tabs 48 connected thereto. The set of memory tabs is characterized by the fact that each set consists of one memory tab selected from each group of memory tabs, a group of memory tabs being associated with a particular voice tab 46. Thus, a single actuating tab 64 will cause a particular shaft 54 to rotate and thereby cause actuation of a set of capture tabs and a corresponding set of memory tabs.

Figure 13:
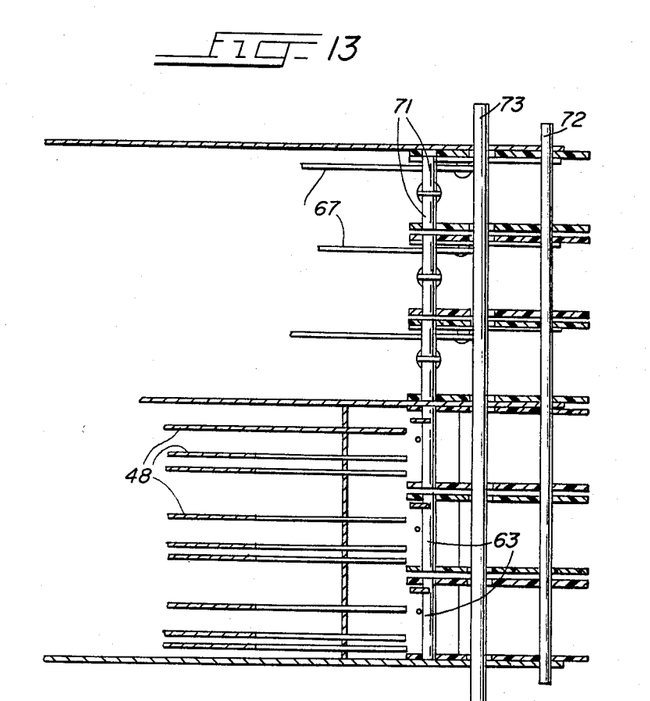
FIGURE 13 is a schematic top view taken along the line 13—13 of FIGURE 7.

The sectional top view of FIGURE 13 illustrates the mounting of voice tabs 46 and actuation tabs 64. Shafts 63 on voice tabs 46 have an equivalent in shafts 71 connected to actuation tabs 64. Both the actuation tabs and the voice tabs are pivoted on a single fixed shaft 72. Similarly, both the voice tabs and the actuation tabs have a common stop rod 73. Stop rod 73 serves to limit the downward motion of the voice tabs and the upward motion of the actuation tabs.

Figure 8:
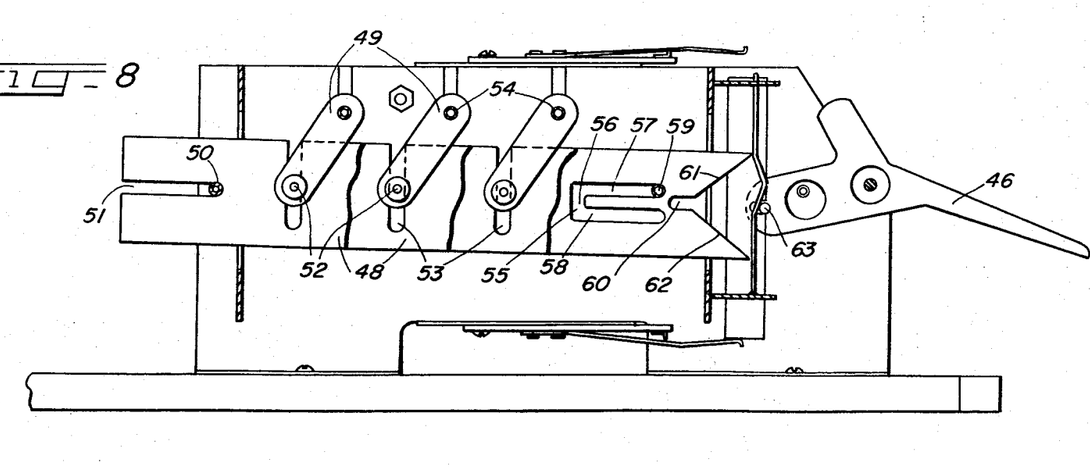
FIGURE 8 is a sectional side view taken along the line 8—8 of FIGURE 11 illustrating the memory tab and capture means of the embodiment shown in FIGURE 7.

In operation the embodiment of this invention described in connection with FIGURES 7–13 is very similar to the embodiment discussed in connection with FIGURES 1–6. Referring particularly to FIGURES 8, 9, and 10, the operation of a single memory tab and its associated elements will be described first. In FIGURES 8 and 9 the capture tabs are in their non-actuated position. Upon energization of the actuation tab 64, capture tab 49 will produce a horizontal motion of memory tab 48 as shown in FIGURE 10. This horizontal motion of memory tab 48 causes either cam surface 61 or cam surface 62 to contact shaft 63 and force it into groove 60. If shaft 59 is in path 58 of the U-shaped groove 55 the memory tab 48 will be in its raised position and will thus place shaft 63 in its uppermost position (as indicated by imaginary line X'—X' in FIGURE 10), thereby placing voice tab 46 in a downward position due to rotation about shaft 72. This horizontal motion also places memory tab 48 in the "set" position by positioning shaft 59 in cross-path 56 of the U-shaped slot 55. Thus, with reference to FIGURE 10, if voice tab 46 were to be raised shaft 59 would be moved to path 57 of the U-shaped slot 55, and any subsequent actuation of memory tab 49 would cause shaft 63 to be positioned in its lowermost position (indicated by imaginary line Y'—Y' in FIGURE 10). The memory condition of memory tab 48 would then be that of shaft 59 in path 57 of the U-shaped slot 55. As in the case of the first embodiment, the shaft 59 will remain in path 57 in the circumstances just described until it is moved back to path 58 by the same procedure as that described.

Figure 12:
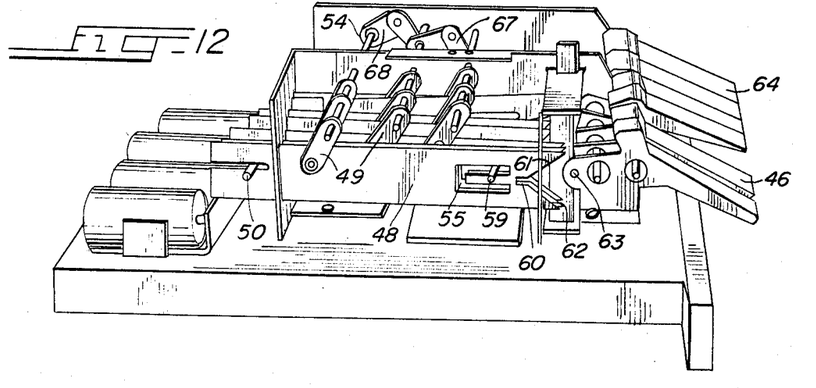
FIGURE 12 is a side perspective view of the embodiment shown in FIGURE 7.

Since the operation of the individual memory tabs in the plural arrangements shown in FIGURES 11–13 is the same as that described in connection with a single unit, it will be obvious that the operation of a plurality of memory tab units is just an accumulation of the operation of individual ones of these units. As in the first embodiment, as many voice tabs will be utilized as is thought necessary for the refinement of the "voice" of the instrument. Also, the number of capture tabs will, up to a point, depend upon the desired combinations that are to be achieved. However, there is a limitation upon the number of capture units that may be utilized since the number of memory tabs is limited by the lengths of shafts 63.

In actual practice, a mechanical capture system produced in accordance with the subject invention can be utilized for the accurate and automatic reproduction of a combination of voice tab positions. For example, with two voice tabs and two capture tabs, each capture tab can be conditioned via memory tab positioning during a "set" position induced by capture tab actuation to reproduce the following voice tab combinations:

| First voice tab | Second voice tab |
| --- | --- |
| (1) first position | first position. |
| (2) first position | second position. |
| (3) second position | first position. |
| (4) second position | second position. |

Thus, if the first capture tab is conditioned to possibility (1) while the second capture tab is conditioned to possibility (2) by appropriate positioning of the corresponding memory tabs to appropriate first and second memory positions, in the manner described above, actuation of either capture tab will position the voice tabs into the indicated possibility positions, regardless of the particular disposition of the voice tabs when the selected capture tab is actuated.

It will be understood that both of the exemplary embodiments disclosed herein (i.e., the FIGURES 1–6 and 7–13 embodiments) are capable of accomplishing the indicated functions. However, the FIGURES 1–6 embodiment is actually the preferred arrangement since the vertical (as opposed to horizontal) dispositions for the memory tabs readily allows for the use of a flexible interconnection between the memory tabs and their associated voice tabs. Accordingly, this preferred embodiment can be utilized in environments where space limitations might limit the matrix capacity of the capture system and can also be utilized, for example, with curved keyboards such as are typically presented in so-called theater organs.

It should be understood that various changes, modifications, and alterations may be effected in the details of construction and arrangements of the various elements described herein, without departing from the spirit and scope of the instant invention as defined in the appended claims.

What is claimed is:

1. A mechanical capture system for controlling the positioning of a musical instrument voice tab is a predetermined one or the other of two positions for the voice tab comprising:
   a positioning shaft connected to the voice tab and having two positions corresponding to the two positions of the voice tab;
   a memory tab engageable with said positioning shaft and having two memory conditions corresponding to said two positions of said positioning shaft;
   a retaining slot formed in said memory tab;
   a memory determining shaft located in said retaining slot and coacting therewith to place said memory tab in a selected one of said memory conditions; and
   capture means operatively connected to said memory tab, actuation of said capture means motivating said memory tab to engage said positioning shaft and set said positioning shaft in a position corresponding to said selected memory condition and thereby set the voice tab in a corresponding position.

2. A mechanical capture system as claimed in claim 1 wherein said retaining slot means comprises a U-shaped slot having a cross path and two parallel paths formed in said memory tab, the location of said memory determining shaft in one or the other of said parallel paths determining said selected memory condition of said memory tab.

3. A mechanical capture system as claimed in claim 1 wherein said memory tab comprises:
   a groove formed in said memory tab adjacent said positioning shaft; and
   cam surfaces formed on either side of said groove and adapted to engage said positioning shaft and thereby force said positioning shaft into said groove upon actuation of said capture means.

4. A mechanical capture system for controlling the positioning of musical instrument voice tabs in a predetermined one or the other of two positions for each voice tab comprising:
   a plurality of positioning shafts, each of said positioning shafts connected to an associated one of the voice tabs and having two positions corresponding to the two positions of the associated voice tab;
   a plurality of groups of memory tabs, each of said memory tabs in one of said groups of memory tabs engageable with an associated positioning shaft, and each of said memory tabs in said one group having two memory conditions corresponding to said two positions of said associated positioning shaft;
   a U-shaped retaining slot having a cross path and two parallel paths formed in each of said memory tabs;
   a plurality of fixed shafts, each of said fixed shafts located in said retaining slots of said memory tabs in one of said groups of memory tabs, the location of a related one of said fixed shafts in one or the other of said parallel paths of a particular memory tab placing said particular memory tab in a selected one of its memory conditions;
   a groove formed in each of said memory tabs adjacent its associated positioning shaft;
   cam surfaces formed on either side of said groove and adapted to engage said associated positioning shaft; and
   a plurality of capture means, each of said capture means connected to a set of memory tabs comprising one memory tab from each of said groups of memory tabs, actuation of a particular one of said capture means motivating its connected memory tabs to have said cam surfaces of each memory tab engage an associated positioning shaft and set said positioning shaft in a position corresponding to said selected memory condition and thereby set the associated voice tab in a corresponding position.

5. A mechanical capture system for controlling the positioning of a musical instrument voice tab in a predetermined one or the other of two voicing positions for the voice tab comprising:
a memory tab having two memory conditions corresponding to the two voicing positions of the voice tab;
retaining slot means formed in said memory tab;
memory determining means located in said slot to place said memory tab in a selected one of said memory conditions;
capture means operatively connected to said memory tab to reciprocally displace said memory tab; and
control means engageable by said memory tab and responsive to displacement thereof to set the voice tab in a voicing position corresponding to said selected memory condition of said memory tab.

6. A mechanical capture system as claimed in claim 5 wherein:
said retaining slot means comprises a U-shaped slot having a cross path and two parallel paths; and
said memory determining means comprises a fixed shaft located in said U-shaped slot, the location of said fixed shaft in one or the other of said parallel paths determining the memory condition in which said memory tab is placed.

7. A mechanical capture system as claimed in claim 5 wherein said control means comprises:
a positioning shaft connected to the voice tab and positionable in a first position when the voicing tab is in its first voicing position and in a second position when the voice tab is in its second voicing position;
a groove formed in said memory tab adjacent said positioning shaft; and
cam surfaces formed on either side of said groove and adapted to contact said positioning shaft and thereby force said positioning shaft into said groove upon actuation of said capture means.

8. A mechanical capture system for controlling the positioning of a musical instrument voice tab in a predetermined one or the other of two positions for the voice tab comprising:
a positioning shaft connected to the voice tab and having two positions corresponding to the two positions of the voice tab;
a memory tab engageable with said positioning shaft and having two memory conditions corresponding to said two positions of said positioning shaft;
a retaining slot formed in said memory tab;
a first fixed shaft located in said retaining slot and coacting therewith to place said memory tab in a selected one of said memory conditions;
a first mounting slot formed in one end of said memory tab;
a second fixed shaft located in said first mounting slot;
a second mounting slot formed in the other end of said memory tab;
a capture tab; and
a connecting shaft positioned on said capture tab and located in said second mounting slot,
whereby actuation of said capture tab causes said connecting shaft to motivate said memory tab to engage said positioning shaft and set said positioning shaft in a position corresponding to said selected memory condition and thereby set the voice tab in a corresponding position.

9. A mechanical capture system as claimed in claim 8 wherein said retaining slot comprises a U-shaped slot having a cross path and two parallel paths, the location of said first fixed shaft in one or the other of said parallel paths determining said selected memory condition of said memory tab.

10. A mechanical capture system as claimed in claim 9 wherein the memory tab comprises:
a groove formed in said memory tab adjacent said positioning shaft; and
cam surfaces formed on either side of said groove and adapted to engage said positioning shaft and thereby force said positioning shaft into said groove upon actuation of said capture tab.

11. A mechanical capture system as claimed in claim 10 wherein said positioning shaft comprises:
a first crank portion adapted to engage said cam surfaces;
a second portion extending from said first crank portion; and
a flexible portion extending from said second portion to the voice tab.

References Cited

UNITED STATES PATENTS

| | | | |
|---|---|---|---|
| 1,462,429 | 7/1923 | Verlinden | 84—345 |
| 1,725,576 | 8/1929 | Flaherty | 84—345 |
| 3,334,534 | 8/1967 | Kiefer | 84—343 |

RICHARD B. WILKINSON, *Primary Examiner.*

L. FRANKLIN, *Assistant Examiner.*